United States Patent [19]
Stalker et al.

[11] 3,846,450
[45] Nov. 5, 1974

[54] PURIFICATION OF OXYGENATED ORGANIC COMPOUNDS
[75] Inventors: Gerald C. Stalker, Bay City; Roscoe L. Pearce, Midland, both of Mich.
[73] Assignee: The Dow Chemical Company, Midland, Mich.
[22] Filed: Sept. 8, 1972
[21] Appl. No.: 287,801

[52] U.S. Cl............ 260/340.2, 260/343.6, 260/463, 260/612 D
[51] Int. Cl............................................ C07d 13/04
[58] Field of Search............. 260/340.2, 343.6, 463, 260/612

Primary Examiner—Norma S. Milestone
Attorney, Agent, or Firm—William M. Yates; Robert W. Selby; Lloyd S. Jowanovitz

[57] ABSTRACT

A method to remove impurities from the oxygenated organic compounds methylphenol ether, diethylcarbonate, butyrolactone and 4-methyl-1,3-dioxolan-2-one by selectively complexing the impurity with a halide of an alkaline earth metal and then removing the so-complexed impurity from the oxygenated compound.

7 Claims, No Drawings

3,846,450

PURIFICATION OF OXYGENATED ORGANIC COMPOUNDS

BACKGROUND OF THE INVENTION

This invention relates to contaminated organic compounds and more particularly to the removal of impurities from oxygen containing organic solvents.

It is known that the halide of an alkaline earth metal can combine and form a complex with compounds such as alcohols, phenols, amines, amino acids, ketones, and amides. Morton, Laboratory Technique in Organic Chemistry 4 (1938) suggests that an organic product will result from the combination of calcium chloride with oxygenated compounds. In McNulty et al., U.S. Pat. No. 3,225,113, a process is described for separating saturated aliphatic and saturated cyclic ethers from an olefinic hydrocarbon by forming a complex between the ether and a halide of an alkaline earth metal.

High purity oxygenated compounds, such as 4-methyl-1,3-dioxolan-2-one, are desirable when used for, for example, electrolytes. Therefore, a process to purify stipulated oxygenated compounds of specific impurities, especially diols, is desired.

SUMMARY OF THE INVENTION

It has suprisingly been found that a halide of an alkaline earth metal reacts and complexes with impurities, such as diols, and simultaneously fails to form a complex with oxygenated organic compounds selected from methylphenol ether and the esters of 4-methyl-1,3-dioxolan-2-one, diethyl carbonate, and butyrolactone. A novel method for removing the diol impurities from such oxygenated compounds comprises contacting the diol contaminated oxygenated compound with a halide of an alkaline earth metal, preferably selected from calcium, magnesium, strontium and barium. More preferably the halide is calcium chloride. A sufficient amount of halide is employed to form a complex or precipitate with the impurity. Preferably, sufficient halide will be added to at least stoichiometrically complex with the impurity.

Contacting can be achieved by passing the oxygenated compound contaminated with a diol, such as mono-, di-, and tri- ethylene and propylene glycols, through a bed or filter of the halide. Alternatively, a halide brine can be added to the contaminated oxygenated compound and mixed for a sufficient time to form a complex or precipitate between substantially all of the impurity and the halide additive.

The halide-diol complex can be readily removed from the oxygenated compound by means generally known to those skilled in the art. For example, the contaminated oxygenated compound can be passed through a filter having a sufficient pore size to remove the precipitated complex. A halide particulate bed of sufficient depth to form a precipitable complex between the diol and halide can be employed to react the diol with the halide and simultaneously filter the diol containing precipitate from the oxygenated compound.

To further illustrate the effectiveness of this invention a solution containing 7 weight percent water, 4 weight percent propylene glycol, 4 weight percent triethylene glycol, and 85 weight percent 4-methyl-1,3-dioxolan-2-one was percolated through a column containing about 8 mesh particulate calcium chloride. Analysis of the so-purified 4-methyl-1,3-dioxolan-2-one detected 0.107 weight percent water, 0.12 weight percent propylene glycol, and only 300–500 parts per million triethylene glycol remaining in the purified compound.

What is claimed is:

1. A method of removing lower alkylene glycol impurities from oxygenated organic compounds comprising contacting a contaminated oxygenated compound selected from the group consisting of methylphenol ether, diethylcarbonate, butyrolactone and 4-methyl-1,3-dioxolan-2-one with a sufficient amount of a halide of an alkaline earth metal selected from the group consisting of calcium, magnesium, strontium, and barium to form a complex with the impurity; removing the alkaline earth metal halide and the impurityalkaline earth metal halide complex from the oxygenated compound thereby purifying the oxygenated compound.

2. The method of claim 1 wherein the oxygenated compound is contacted with at least a stoichiometric amount of the halide.

3. The method of claim 1 wherein the alkaline earth metal is calcium chloride.

4. A method of purifying 4-methyl-1,3-dioxolan-2-one comprising flowing a glycol contaminated 4-methyl-1,3-dioxolan-2-one through a bed of particulate calcium chloride of sufficient bed depth to at least stoichiometrically form a complex between at least the calcium chloride and the glycol, the glycol being selected from the group consisting of triethylene and propylene glycols; and simultaneously filtering the 4-methyl-1,3-dioxolan-2-one through the calcium chloride bed to remove the complex and purify the 4-methyl-1,3-dioxolan-2-one.

5. The method of claim 1 wherein the impurity is selected from the group consisting of mono-, di-, and tri- ethylene and propylene glycols.

6. The method of claim 1 wherein the impurity is selected from the group consisting of triethylene and propylene glycols and the oxygenated compound is 4-methyl-1,3-dioxolan-2-one.

7. The method of claim 3 including passing the oxygenated compound through a bed containing at least a stoichiometric amount of calcium chloride.

* * * * *